United States Patent [19]

Kimura et al.

[11] 3,994,842

[45] Nov. 30, 1976

[54] RUBBER WITH ORGANIC ACID AND METHOXY METHYL NYLON, SULFUR VULCANIZED

[75] Inventors: Takeshi Kimura, Koganei; Yutaka Iseda, Tachikawa; Shiro Anzai, Higashi-Murayama, all of Japan

[73] Assignee: Bridgestone Tire Company Limited, Tokyo, Japan

[22] Filed: June 9, 1975

[21] Appl. No.: 585,211

Related U.S. Application Data

[63] Continuation of Ser. No. 408,907, Oct. 23, 1973, abandoned.

[30] Foreign Application Priority Data

Oct. 24, 1972 Japan............................... 47-105772

[52] U.S. Cl....................................... 260/3; 260/21; 260/39 R; 260/45.8 N; 260/852
[51] Int. Cl.² ...................... C08L 7/00; C08L 77/06
[58] Field of Search............................ 260/3, 21, 852

[56] References Cited
UNITED STATES PATENTS

| | | | |
|---|---|---|---|
| 2,474,923 | 7/1949 | Watkins.......................... | 260/78 SC |
| 2,714,097 | 7/1955 | Watson et al.......................... | 260/3 |
| 2,822,026 | 2/1958 | Willis.................................. | 260/852 |
| 2,916,471 | 12/1959 | Rosahl et al......................... | 260/852 |
| 3,638,702 | 2/1972 | Endter.................................. | 260/852 |

*Primary Examiner*—Murray Tillman
*Assistant Examiner*—Art Koeckert
*Attorney, Agent, or Firm*—Sughrue, Rothwell, Mion, Zinn & Macpeak

[57] ABSTRACT

Reinforced rubber composites having high Young's modulus and tear energy and a highly improved creep strength are produced by melt-blending 100 parts by weight of a natural or synthetic rubber, 5–150 parts by weight of N-methoxymethylated nylon (degree of N-methoxymethylation: 10–40 mol%) in the presence of or in the absence of a filler and an antioxidant in Banbury mixer, mixing thereto 5–20 parts by weight based on 100 parts of said nylon, of a higher saturated aliphatic monobasic organic acid which is a cross-linking agent for N-methoxymethylated nylon, 0.5–20 parts by weight based on 100 parts of the rubber, of a cross-linking agent for rubber and an appropriate amount of compounding agents and simultaneously cross-linking the rubber and the N-methoxymethylated nylon.

8 Claims, No Drawings

RUBBER WITH ORGANIC ACID AND METHOXY METHYL NYLON, SULFUR VULCANIZED

This is a continuation of application Ser. No. 408,907, filed Oct. 23, 1973, now abandoned.

BACKGROUND OF THE INVENTION

1. Field of the Invention

The present invention relates to rubber-N-methoxymethylated nylon reinforced rubber composites and more particularly to reinforced rubber composites obtained by melt-blending 100 parts by weight of a natural or synthetic rubber and 5–150 parts by weight of N-methoxymethylated nylon (degree of N-methoxymethylation: 10–40 mol%) in the presence of or in the absence of compounding agents, such as filler, antioxidant and the like in Banbury mixer and mixing thereto 5–20 parts by weight based on 100 parts of the above described nylon, of a higher saturated aliphatic monobasic organic acid of a cross-linking agent for N-methoxymethylated nylon, 0.5–20 parts by weight based on 100 parts of rubber of a vulcanizing agent for rubber and an appropriate amount of compounding agents and then effecting simultaneous cross-linking of the rubber and N-methoxymethylated nylon.

2. Description of the Prior Art

It has been publicly known that reinforced rubber composites are produced by mechanically blending well known reinforcing agents, such as carbon black, white carbon, light calcium carbonate, styrene resins, phenolic resins, melamine resins, petroleum resins, nylon resins and the like to a general purpose rubber and that by such means the mechanical properties of the general purpose rubber can be improved. However, it has been also known that the rubber composites obtained by such a general blending means do not necessarily show satisfactory physical properties. Particularly, among the physical properties of the rubber composites, the high Young's modulus or the creep strength is in inverse proportion to the tear strength and there has never been found the rubber composites in which these properties are balanced.

Namely, the previous process for improving on the high Young's modulus of the general purpose rubbers comprises mechanically blending the above described inorganic or organic rubber reinforcing agents to the rubber but it has been very difficult to highly improve the creep strength and the tear strength in addition to the high Young's modulus. The creep strength of the general purpose rubber materials is more than about 30% and the improvement of the creep strength has been demanded.

In the present rubber industry, inexpensive rubber composites having a high Young's modulus in which the above described inconsistent properties are satisfied, are demanded for production of industrial articles, for example tires, belts, hoses and the like.

Hitherto, as a unique material in field of materials having a high Young's modulus, urethane rubber has been known but urethane rubber is insufficient in the tear strength and is expensive and therefore the application is considerably limited.

Accordingly, in order to solve this problem of the improvement of these inconsistent properties, a development of reinforced rubber composites having a novel structure has been demanded.

SUMMARY OF THE INVENTION

The inventors have made many investigations with respect to the relation between the structure and the physical properties of the reinforced rubber composites having the above described inconsistent properties and as the result the inventors have taken notice of the following composite structure and found the desired rubber composites after the diligent study. That is, as the component to provide the high Young's modulus to the general purpose rubber, an attention has been directed to a substance which has a certain degree of rubbery elasticity, a properly high Young's modulus as compared with the general purpose rubber and such a property that a breakage drawback of stress concentration and the like is hardly caused in the deformation of the material, in view of the improvement of tear strength and which can form a three dimensional gellation through cross-linking in view of the improvement of creep strength and various investigations have been made and N-methoxymethylated nylon known as a modified nylon, which has a relatively high Young's modulus and a flexibility and is cross-linkable, is noticed. It has been found that rubber-N-methoxymethylated nylon composite forms interpenetrating polymer networks of two different phases in which two different three dimensional structures are entangled. This rubber composite has a high Young's modulus and a creep of less than 15% and is referred to as "reinforced rubber composite", because the high Young's modulus can be retained without needing a reinforcing agent as mentioned above.

Such a development of the reinforced rubber composite having a high Young's modulus owing to the specific structure has not substantially been made but has succeeded only by the new idea reached by the study of the relation between the structure and the physical properties.

This novel reinforced rubber composite is obtained by melt-blending N-methoxymethylated nylon to a natural or synthetic rubber in the presence of or in the absence of a filler, such as carbon black and a compounding agent, such as an antioxidant in Banbury mixer to form the stage I masterbatched compound and mixing thereto a higher saturated aliphatic monobasic organic acid of a cross-linking agent for N-methoxymethylated nylon, a cross-linking agent for rubber, a compounding agent and the like in the same manner as in the stage II masterbatch and simultaneously cross-linking the rubber and the modified nylon under the same condition. Only by the above described specific process, the present invention has been attained and the other mixing processes, for example a usual blending process and a modified nylon solution blending process, can not provide the rubber composite having the desired physical properties.

It was confirmed from the comparison of dispersion of dynamic modulus, which is a physical analytical means, whether the cross-linkage of the modified nylon is formed or not. As shown in Example, in the creep strength corresponding to the parameter of the dimensional stability, there is a very large difference between the cross-linked N-methoxymethylated nylon and the non-cross-linked N-methoxymethylated nylon and since N-methoxymethylated nylon added with the cross-linking agent improves noticeably the creep strength, it can be conceived that the cross-linking occurs.

DETAILED DESCRIPTION OF THE PREFERRED EMBODIMENT

Natural and synthetic rubbers to be used in the present invention vary depending upon the use object of the reinforced rubber composite and are not limited. These rubbers are, for example rubbers to be used for tires, such as natural rubber, polyisoprene, polybutadiene, butadienestyrene copolymer, EPDM and the like; rubbers to be used for industrial articles, such as belts, hoses and the like, for example, butadiene-acrylonitrile copolymer, polychloroprene butyl rubber, chlorinated polyethylene, chlorosulfonated polyethylene, epichlorohydrin rubber, polypropylene oxide and the copolymers thereof and the other cross-linkable polymers can be used. Among them, the most preferable rubbers are dienic homopolymers or copolymers and natural rubber, polyisoprene, polybutadiene or butadiene-styrene copolymer is particularly preferable.

The modified nylons to be used in the present invention, that is, N-methoxymethylated nylons are obtained by reacting usual nylon-6, nylon-66, nylon-11, nylon-12 or copolymeric nylons with methanol and formaldehyde in formic acid and the kind and molecular weight of the basic nylon, and the degree of N-methoxymethylation may be freely selected. As the kind of modified nylon, N-methoxymethylated nylon-6 is usually used.

In the selection of modified nylon the modecular weight of the starting nylon is preferred from experience to be more than 10,000 in the number average molecular weight in view of the physical property and the degree of N-methoxymethylation is optimum within a range of 10–40 mol% in view of balance of maintenance of the physical merits of the starting nylon and the merits of the modification, and of the reaction operation of N-methoxymethylation. The shape of the modified nylon is not particularly limited but the powdery form is most preferable in view of workability and dispersability. The mixture ratio of the modified nylon to natural or synthetic rubber varies depending upon the use object and is not particularly limited but said ratio is 5–150 parts by weight of the modified nylon to 100 parts by weight of rubber. When the ratio is less than 5 parts by weight, the addition effect is not apparent as compared with that of no addition and when the ratio is more than 150 parts by weight, the workability becomes difficult. The preferable range is 15–150 parts by weight and in this range, the rubber composite has Young's modulus of more than 100 Kg/cm$^2$, a high tear energy and a creep of less than 10%.

As the cross-linking agents for N-methoxymethylated nylon, lower organic acids, such as citric acid, tartaric acid and the like and inorganic acids, such as hypophosphorous acid are well known but these acids retard considerably the vulcanization by sulfur which is one of the cross-linking agents for rubber and deteriorate the physical properties of the vulcanized rubber.

The cross-linking agents for N-methoxymethylated nylon to be used in the present invention include higher saturated aliphatic monobasic organic acids, for example palmitic acid, stearic acid and the like and are selected from at least one of saturated aliphatic acids having even number of carbon atoms between myristic acid (carbon atom: 14) and behenic acid (carbon atom: 22). Particularly preferable is a mixed orgainic acid of about 40% by weight of palmitic acid and about 60% of stearic acid. The amount of the cross-linking agents for the modified nylon to be used varies depending upon the degree of N-methoxymethylation, molecular weight of the modified nylon and the cross-linking agent for rubber to be mixed afterwards but the amount is 5–20 parts by weight based on 100 parts by weight of the modified nylon, preferably 8–15 parts by weight.

The addition of the cross-linking agent more than the amount necessary for cross-linking of the modified nylon retards the vulcanization of sulfur, which is one of the cross-linking agents for rubber and further lowers the Young's modulus and strength of the resulting vulcanized product and is not desirable in view of the reaction and physical properties.

On the other hand, when the amount is too small, the modified nylon is not sufficiently cross-linked. Consequently, the optimum amount of cross-linking agent for the modified nylon is usually determined in relation to the cross-linking agent for rubber.

The cross-linking agents for the modified nylon, which have an important role for accomplishing the present invention, must not inhibit the cross-linking of rubber and it is a very important factor for obtaining the excellent physical properties that said cross-linking agent is selected from the higher saturated aliphatic monobasic organic acids. The optimum point of the strict reaction conditions of the simultaneous cross-linking is generally determined by vulcanization curve obtained by rheometer. In general, in the vulcanization with sulfur, said cross-linking is effected within a range of 100°–200° C.

The cross-linking agent for rubber is preferred to be sulfur vulcanization system and the amount to be used is 0.5–20 parts by weight based on 100 parts by weight of rubber, preferably 1–5 parts by weight. Among the sulfur vulcanization system, sulfur is particularly preferable. Of course, the cross-linking process using organic peroxides, metal oxides and the like or the cross linking process using radiation may be used.

The process for mixing the above described various compounding agents for accomplishing the present invention must be carried out by a specific process.

Namely, firstly a rubber and the modified nylon are melt-blended in Banbury mixer at a temperature of 100°–200° C. To the resulting blend are mixed a cross-linking agent for the modified nylon, a cross-linking agent for rubber and compounding agents for rubber by a well known mixing process, for example open roll.

As the process for mixing a rubber and the modified nylon, there are a solution blend process wherein the modified nylon is dissolved in a solvent, such as methanol and the resulting solution is incorporated into the rubber and a process wherein a rubber and the modified nylon are blended on an open roll but as shown in Example mentioned hereinafter, in both processes the mixed and dispersed state is poor and the physical properties of the resulting cross-linked product are much lower.

That is, the present invention must melt-blend the rubber and the modified nylon at a high temperature and then the cross-linking agents are blended thereto to obtain the rubber composite having the desired physical properties.

The reinforced rubber composite obtained by the present invention shows the characteristic physical properties as shown in Examples and can be used in a broad field of plastics or rubber alone or in a mixture as the high modulus materials for improving the physical properties, which have a compatibility.

The following examples are given for the purpose of illustration of this invention are not intended as limitations thereof.

EXAMPLE 1

100 parts by weight of natural rubber, 55 parts by weight of carbon black, 1 part by weight of antioxidant of 1,2-dihydro-2,2,4-trimethylquinoline polymer (RD) and 100 parts by weight of N-methoxymethylated nylon (molecular weight: 14,000, degree of N-methoxymethylation: 30 mol%, 80 mesh powder) were added into Banbury mixer in this order and the modified nylon was melt-blended at 160°–170° C for 3 minutes to form stage I masterbatched compound and then 12 parts by weight of a mixture of palmitic acid/stearic acid (4 : 6), 5 parts by weight of zinc white, 2 parts by weight of stearic acid for rubber compounding, 1 part by weight of N-cyclohexyl-2-benzothiazolsulfenamide (CZ) of an accelerator for vulcanization and 2.5 parts by weight of sulfur were added thereto and blended at a temperature range of about 70°–120° C for 3 minutes in the same manner as in the usual stage II (final) condition to obtain the stage II (final) product, which was formed into an appropriate thickness by means of an open roll and fed into a mold and then the rubber and the modified nylon were simultaneously cross-linked under vulcanization conditions of 150° C and 15 minutes to prepare a test sample for physical properties.

For comparison, a comparative sample (Comparative Example) was prepared by using the same composition and manner as described above except that the modified nylon and the cross-linking agent for the modified nylon were not added.

The results of test for physical properties of the above described samples are shown in the following Table 1.

Table 1

|  | Hardness (JIS) | Tensile strength (Kg/cm$^2$) | Elongation (%) | Young's$^{(1)}$ modulus (Kg/cm$^2$) | Tear$^{(2)}$ energy (Kg/cm) | Creep$^{(3)}$ (%) |
|---|---|---|---|---|---|---|
| Example 1 | 89 | 206 | 410 | 283 | 81 | 2.5 |
| Comparative Example 1 | 70 | 222 | 340 | 55 | 42 | 30.0 |

Note:
$^{(1)}$Calculated from 10% modulus.
$^{(2)}$Tensile Strip type Tear [Process described in H. W. Greensmith: J. Appl. Polymer Sci., 7, 993 (1963)].
$^{(3)}$Difference of creep after 24 hours under a stress of 20 Kg/cm$^2$ at 80° C from the original creep (after one hour) (the smaller value is more excellent).

As seen from Table 1, by the method of the present invention, the reinforced rubber composite having a very high hardness, a high Young's modulus, a sufficient elongation, a very large tear energy and an excellent creep strength without deteriorating the critical tensile strength of rubber can be obtained. On the contrary, the comparative sample not containing the modified nylon is considerably inferior in any of Young's modulus, tear energy and creep strength to the sample of the present invention.

Furthermore, in this case, the workability in compounding and the mixed and dispersed state in the rubber composite added with the modified nylon according to the present invention are very good, because the melt-blending process is adopted and is not substantially different from the rubber composite not added with the modified nylon.

Furthermore, as the process for adding the modified nylon, instead of the melt-blending with rubber, the following processes were effected.

1. The modified nylon was dissolved in methanol and the resulting solution was blended with a rubber.
2. The modified nylon was mixed with a rubber on an open roll.

In any process, the mixed and dispersed state was poor and the workability was not good. Moreover, the resulting composites were very low in the tensile strength, elongation and the other physical properties.

EXAMPLES 2 and 3

In Example 2, a test sample was prepared by using 100 parts by weight of natural rubber, 50 parts by weight of modified nylon and 6.0 parts by weight of a cross-linking agent for the modified nylon in the same manner as described in Example 1.

Furthermore, in Example 3, a test sample was prepared by using 15 parts by weight of the modified nylon and 1.8 parts by weight of the cross-linking agent in the same manner as described above.

Moreover, a comparative sample was prepared in the same composite as described in Example 2 except that the cross-linking agent for the modified nylon was not added.

The composites used herein are shown in the following Table 2 in detail.

Table 2

|  | Example 2 (part) | Example 3 (part) | Comparative Example 2 (part) |
|---|---|---|---|
| Natural rubber | 100 | 100 | 100 |
| Carbon black (FEF) | 55.0 | 55.0 | 55.0 |
| Antioxidant (RD) | 1.0 | 1.0 | 1.0 |
| Modified nylon | 50.0 | 15.0 | 50.0 |
| Cross-linking agent$^{(1)}$ for modified nylon | 6.0 | 1.8 | — |
| Zinc white | 5.0 | 5.0 | 5.0 |
| Stearic acid for rubber compounding | 2.0 | 2.0 | 2.0 |
| Accelerator CZ | 1.0 | 1.0 | 1.0 |
| Sulfur | 2.5 | 2.5 | 2.5 |
| Simultaneous cross-linking condition (° C × min) | 150 × 13 | 150 × 10 | 150 × 12 |

Note: $^{(1)}$Palmitic acid/Stearic acid = 4/6 (wt)

The results of the obtained physical properties are shown in the following Table 3.

Table 3

|  | Hardness (JIS) | Tensile strength (Kg/cm$^2$) | Elongation (%) | Young's$^{(1)}$ modulus (Kg/cm$^2$) | Tear$^{(2)}$ energy (Kg/cm) | Creep$^{(3)}$ (%) |
|---|---|---|---|---|---|---|
| Example 2 | 84 | 189 | 360 | 179 | 68 | 4.0 |
| Example 3 | 76 | 206 | 310 | 105 | 58 | 9.3 |
| Comparative Example 2 | 83 | 229 | 450 | 170 | 66 | 35.0 |

Example 2 and Comparative Example 2 show the comparison of an embodiment of the cross-linked modified nylon with an embodiment of the non-cross-linked modified nylon. Example 3 shows embodiment of the cross-linked modified nylon wherein an amount of the modified nylon added is small.

As seen from the above Table 3, the reinforced rubber composite in Example 2 is more excellent than that in Comparative Example 2 particularly in the creep strength and retains a high Young's modulus and a high tear energy. It is construed that this is resulted from the fact that the methoxymethyl group is introduced into nitrogen in amide group of nylon-6 to reduce hydrogen bonding ability due to the active hydrogen and a cross-linkable modified nylon having a rubbery elasticity in which the crystallization of nylon is retarded to a certain degree, forms a cross-linked structure of nylon portion in the rubber composite.

What is claimed is:

1. Reinforced rubber composites obtained by melt-blending a composition consisting essentially of 100 parts by weight of a natural or synthetic rubber, 5–150 parts by weight of N-methoxymethylated nylon (degree of N-methoxymethylation: 10–40 mol%) in the presence of or in the absence of a filler in Banbury mixer, mixing thereto a composition consisting essentially of 5–20 parts by weight based on 100 parts of said nylon, of a higher saturated aliphatic monobasic organic acid having an even number of carbon atoms and containing between 14 and 22 carbon atoms which is a cross-linking agent for N-methoxymethylated nylon, 0.5–20 parts by weight based on 100 parts of the rubber, of a sulfur vulcanization system cross-linking agent for rubber and an appropriate amount of compounding agents and simultaneously cross-linking the rubber and the N-methoxymethylated nylon.

2. The reinforced rubber composites as claimed in claim 1, which has a Young's modulus of more than 100 Kg/cm$^2$ and a creep strength of less than 10% while retaining a high tear energy.

3. The reinforced rubber composites as claimed in claim 1, wherein 15–150 parts by weight of N-methoxymethylated nylon is used.

4. The reinforced rubber composites as claimed in claim 1, wherein 8–15 parts by weight of the higher saturated aliphatic monobasic organic acid is used.

5. The reinforced rubber composites as claimed in claim 1, wherein the higher saturated aliphatic monobasic organic acid is palmitic acid, stearic acid or the mixture of these acids.

6. The reinforced rubber composites as claimed in claim 1, wherein the cross-linking agent for rubber is sulfur and the amount to be used is 1–5 parts by weight.

7. The reinforced rubber composites as claimed in claim 1, wherein said rubber is at least one of natural rubber, polyisoprene, polybutadiene and butadiene-styrene copolymer.

8. The reinforced rubber composites as claimed in claim 1, wherein the rubber and N-methoxymethylated nylon are melt-blended at a temperature of 100°–200° C.

* * * * *